Feb. 13, 1968  H. STOECKEL  3,368,745

MOTION TRANSMITTING ARRANGEMENT

Filed Feb. 18, 1966

INVENTOR.
HENRY STOECKEL
BY
Michael J. Striker
his ATTORNEY

United States Patent Office 3,368,745
Patented Feb. 13, 1968

3,368,745
MOTION TRANSMITTING ARRANGEMENT
Henry Stoeckel, Ehrenfriedersdorf, Erzgebirge, Germany, assignor to Veb DKK Scharfenstein, Erzgebirge, Germany
Filed Feb. 18, 1966, Ser. No. 528,451
9 Claims. (Cl. 230—214)

ABSTRACT OF THE DISCLOSURE

A motion transmitting arrangement comprises a rotary crank shaft and a crank pin which is eccentrically supported by the crank shaft so as to orbit when the latter rotates. A motion receiving element is reciprocable in a predetermined path. A magnetic coupling is provided for reciprocating the motion receiving element when the crank pin orbits. The coupling comprises a disc-shaped magnet member concentrically supported by the crank pin and a paramagnetic member in form of an arcuate shoe of ferromagnetic material which is secured to the other element and which defines a groove receiving a marginal portion of the magnet member.

Figure 1:
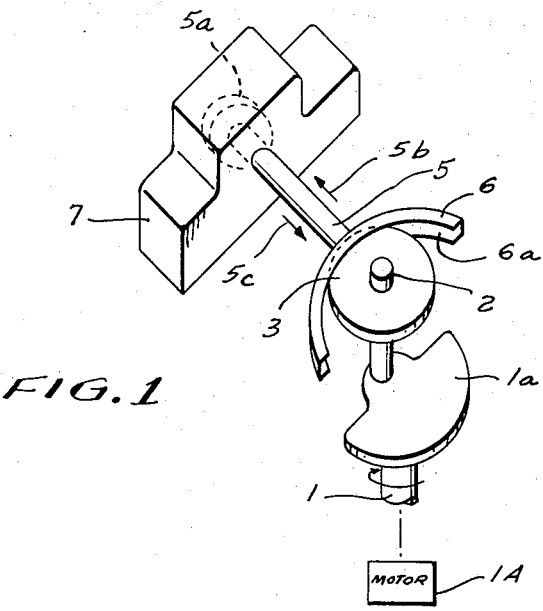

The present invention relates to motion transmitting arrangements in general, and more particularly to improvements in motion transmitting arrangements which can reciprocate a driven element in response to rotary or orbiting movement of a driving element. For example, the arrangement of my invention may be utilized to reciprocate the piston rod of a hermetically sealed compressor for refrigerators or similar appliances.

A serious drawback of many presently known motion transmitting arrangements which are utilized to reciprocate the piston rod of a compressor is that the component parts of the motion transmitting arrangement are subjected to extensive wear and become overheated. Also, the relatively movable parts must be finished with utmost precision and they often produce considerable noise. Furthermore, minute metallic particles which are separated from metallic parts in response to movement of component parts in conventional motion transmitting arrangements are likely to escape into the atmosphere or to penetrate into the compressor. Still further, the piston rod is likely to jam. Conventional motion transmitting arrangements are disclosed, for example, in U.S. Patents Nos. 2,287,203 and 2,766,929.

Accordingly, it is an important object of the present invention to provide an arrangement which can convert rotary or orbiting motion into reciprocatory motion and to construct and assemble the improved arrangement in such a way that the driven part or parts need not be positively connected with the driving parts so that such parts may be separated from each other in a very simple and time-saving manner.

Another object of the invention is to provide an arrangement of the just outlined characteristics which is of lightweight construction, which automatically prevents undesirable angular displacements of reciprocable parts, whose operation produces very little noise and generates little heat, and which can be readily utilized in presently known refrigerating and many other apparatus without necessitating substantial alterations in the construction, design and mounting of such apparatus.

A further object of the invention is to provide a motion transmitting arrangement wherein the parts which are subjected to wear can be readily inspected, replaced and/or refinished with little loss in time and wherein such parts automatically collect all metallic particles which might be suspended in the surrounding atmosphere.

A concomitant object of the invention is to provide a motion transmitting arrangement which is not prone to malfunction, which can operate properly after its relatively movable parts have undergone considerable wear, and which requires little attention once it is properly installed in a compressor or in another machine with one or more reciprocable components.

Briefly stated, one feature of my present invention resides in the provision of a motion transmitting arrangement which comprises a shaft rotatable about a fixed axis, a motion transmitting element eccentrically supported by the shaft to orbit about the fixed axis when the shaft rotates, a motion receiving element which is reciprocable in a predetermined path, and a coupling for reciprocating the motion receiving element in response to orbiting of the motion transmitting element. The coupling comprises a permanent magnet which is secured to one of the elements and a ferromagnetic or other suitable paramagnetic member secured to the other element and attracted by the magnet. In one of its preferred applications, the improved motion transmitting arrangement may be utilized to reciprocate the piston in a sealed compressor unit or in a similar working machine in response to rotation of a crank shaft whose crank arm carries an eccentric crank pin constituting the aforementioned motion transmitting element. The magnet may resemble a disk which is concentrically supported by the crank pin and the paramagnetic member may be constituted by an arcuate shoe which is rigidly or articulately connected to the piston rod of the piston and may be provided with a groove which receives a marginal portion of the disk-shaped magnet to prevent rotation of the piston rod. The piston rod constitutes the aforementioned motion receiving element and reciprocates to perform strokes of a length determined by the eccentricity of the crank pin. The force of the magnet is so strong that the paramagnetic shoe permanently adheres thereto whereby the piston rod performs a stroke in a first direction when the shoe follows the magnet and a stroke in the other direction when the shoe is pushed by the magnet.

Figure 2:
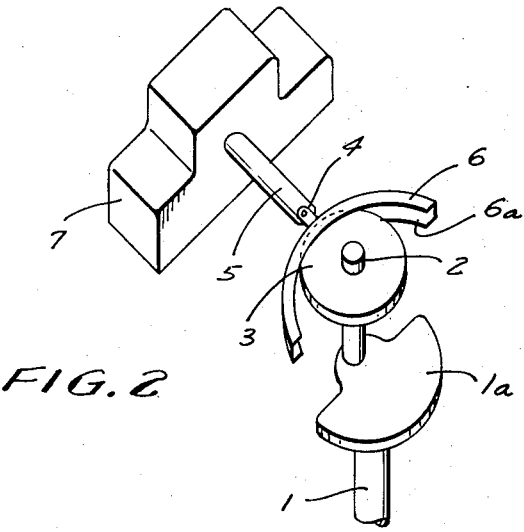

The novel features which are considered as characteristic of the invention are set forth in particular in the appended claims. The improved motion transmitting arrangement itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic perspective view of a motion transmitting arrangement which embodies one form of my invention and wherein one component of the coupling is rigid with the motion receiving element; and FIG. 2 is a similar perspective view of a modified arrangement wherein the motion receiving element is articulately connected with the corresponding component of the coupling.

Referring to the drawings in detail, and first to FIG. 1, there is shown a motion transmitting arrangement which comprises a crank shaft 1 rotatable about a fixed vertical axis and driven by a suitable electric motor 1A or the like. The upper end portion of the crank shaft 1 carries a crank arm 1a which in turn carries an eccentric crank pin 2 constituting the motion transmitting element of the improved arrangement. The motion receiving element is constituted by a piston rod 5 which is reciprocable in a horizontal path and is attached to a piston 5a received in the chamber of a cylinder which is accommodated in a casing 7. The latter can constitute the casing of a small sealed compressor unit of the type normally employed in household refrigerators or similar appliances. The coupling between the crank pin 2 and the piston rod 5 comprises a disk-shaped permanent magnet 3 which is supported by the orbits with the pin 2 about the axis of the crank shaft 1, and a ferromagnetic shoe or follower 6 which is rigidly affixed to the exposed end of the piston rod 5. The shoe 6 is formed with a groove 6a and its flanges respectively overlie the upper side and the underside of that marginal portion of the magnet 3 which extends into the groove 6a. In this way, the piston rod 5 is held against rotation about its own axis. The attractive force of the magnet 3 is strong enough to insure that the magnet collects all metallic particles which become separated from the coupling in response to wear upon the magnet 3 and/or shoe 6 when the shaft 1 rotates.

The piston 5a performs working strokes (arrow 5b) due to eccentricity of the crank pin 2. The magnet 3 causes the piston rod 5 to perform return strokes (arrow 5c) because it attracts the shoe 6. The operation of the motion transmitting arrangement is practically noiseless and the wear upon the relatively moving parts is very small. Any repairs which might become necessary can be carried out with little loss in time because the magnet 3 can be separated from the shoe 6 by overcoming the magnetic force so that the shoe and/or magnet may be inspected, refinished and/or replaced in a very simple way.

The shoe 6 will constitute a permanent magnet if the disk 3 consists of ferromagnetic material, i.e., the magnet may be mounted on the pin 2 or on the piston rod 5.

The motion transmitting arrangement of FIG. 2 comprises all of the parts which were described in connection with FIG. 1 and further includes an articulate connection 4 which enables the shoe 6 to pivot with reference to the piston rod 5 about an axis which is normal to the path of the piston rod. The magnet 3 may rotate with or relative to the crank pin 2 so that it actually rolls along the shoe 6, and the eccentricity of the pin 2 with reference to the crank shaft 1 determines the length of strokes which the piston rod 5 can perform. It is clear that the coupling including the magnet 3 and shoe 6 may be modified by forming the magnet with one or more circumferential grooves and by providing the shoe with an equal number of ribs which extend into the respective grooves and thereby prevent rotation of the piston rod 5. It is further clear that the improved motion transmitting arrangement can be put to use in all such machines or appliances wherein a rotary driving member must transmit motion to a reciprocable driven member.

The improved motion transmitting arrangement can be utilized with particular advantage in hermetically sealed compressors for refrigerating apparatus. This is due to the fact that its parts produce little heat so that such negligible generation of heat affects very little the efficiency of the refrigerating apparatus. The wear on the coupling of my improved arrangement is negligible because the magnet 3 can roll in the groove 6a of the shoe 6. Metallic particles which are attracted by the coupling are prevented from contaminating the medium and/or from penetrating into the cylinder 7 and other parts of the system. The arrangement is very compact and can be readily used in presently known compressors. The weight of the coupling is very small which is of particular importance when the refrigerating apparatus comprises several cylinders and pistons which are operated by a common motion transmitting arrangement.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A motion transmitting arrangement, comprising a rotary crank shaft; a crank pin eccentrically supported by said crank shaft to orbit when the shaft rotates; a motion receiving element reciprocable in a predetermined path; and a coupling for reciprocating said motion receiving element in response to orbiting of said motion transmitting element, comprising a disk-shaped magnet member secured to and concentrically supported by said crank pin and a paramagnetic member in form of an arcuate shoe of ferromagnetic material secured to the other element and defining a groove which receives a marginal portion of said magnet member.

2. An arrangement as set forth in claim 1, wherein said shoe is rigid with said motion receiving element.

3. An arrangement as set forth in claim 1, wherein said shoe is pivotable with reference to said motion receiving element about an axis which is normal to said predetermined path.

4. An arrangement as set forth in claim 1; further comprising a fixed cylinder and a piston reciprocably received in said cylinder and coupled with said motion receiving element so that the latter constitutes a piston rod and reciprocates said piston in said cylinder.

5. An arrangement as set forth in claim 4, further comprising means provided on said coupling for preventing rotation of said piston rod.

6. An arrangement as set forth in claim 1, wherein the force of said magnet suffices to attract all such metallic particles which happen to be separated from said coupling in response to wear upon the parts of said coupling.

7. An arrangement as set forth in claim 1, wherein said motion receiving element is articulately connected with the respective component of said coupling.

8. An arrangement as set forth in claim 1, wherein said predetermined path extends substantially radially of said shaft.

9. A motion transmitting arrangement, comprising a rotary shaft; a motion-transmitting element eccentrically supported by said shaft so as to orbit when said shaft rotates; a motion-receiving element reciprocable in a predetermined path; and a coupling for reciprocating said motion-receiving element in response to orbiting of said motion-transmitting element, said coupling comprising a magnet member and a paramagnetic member attracted by said magnet member and each being carried by one of said elements, one of said members having a circumferentially arcuate marginal portion and the other of said members defining an arrcuate groove in which said marginal portion is received.

References Cited

UNITED STATES PATENTS

| 1,764,712 | 6/1930 | Brackett et al. | 103—213 X |
| 2,507,879 | 5/1950 | Beaudoin | 103—213 X |
| 2,788,748 | 4/1957 | Szczepanek | 103—123 |

FOREIGN PATENTS 681,601   5/1930   France.

ROBERT M. WALKER, *Primary Examiner.*